United States Patent
Rousseau et al.

(10) Patent No.: US 9,888,183 B2
(45) Date of Patent: Feb. 6, 2018

(54) OPTICAL SYSTEM FOR IMAGING AN OBJECT

(71) Applicant: ESSILOR INTERNATIONAL (COMPAGNIE GENERALE D'OPTIQUE), Charenton-le-Pont (FR)

(72) Inventors: Denis Rousseau, Charenton-le-Pont (FR); Gerard Gelly, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/995,860

(22) Filed: Jan. 14, 2016

(65) Prior Publication Data
US 2016/0212350 A1    Jul. 21, 2016

(30) Foreign Application Priority Data

Jan. 15, 2015    (EP) ..................................... 15305035

(51) Int. Cl.
| | |
|---|---|
| H04N 5/225 | (2006.01) |
| H04N 5/232 | (2006.01) |
| G02B 25/00 | (2006.01) |
| G03B 17/56 | (2006.01) |
| G03B 17/04 | (2006.01) |
| G03B 17/48 | (2006.01) |
| G03B 15/05 | (2006.01) |

(52) U.S. Cl.
CPC ....... *H04N 5/23293* (2013.01); *G02B 25/002* (2013.01); *G02B 25/007* (2013.01); *G03B 17/04* (2013.01); *G03B 17/48* (2013.01); *G03B 17/561* (2013.01); *G03B 17/563* (2013.01); *H04N 5/2251* (2013.01); *H04N 5/2252* (2013.01); *H04N 5/2253* (2013.01); *H04N 5/2254* (2013.01); *H04N 5/2257* (2013.01); *H04N 5/23296* (2013.01); *G03B 15/05* (2013.01)

(58) Field of Classification Search
CPC .......... H04N 2201/3245; H04N 5/2252; G06F 21/30; G03B 13/36; G03B 17/00; G09G 3/19; G02B 27/01
USPC ................... 348/373, 374, 376, 333.04, 345; 396/535–541, 419–428; 352/243; 345/49, 7; 349/11
See application file for complete search history.

(56) References Cited

U.S. PATENT DOCUMENTS

| | | | |
|---|---|---|---|
| 6,853,482 B1 * | 2/2005 | Kitamura | G02B 21/08 359/368 |
| 2007/0098237 A1 * | 5/2007 | Yoo | A61C 1/082 382/128 |
| 2007/0140678 A1 * | 6/2007 | Yost | H04N 1/00183 396/147 |
| 2008/0002964 A1 * | 1/2008 | Edwards | G03B 13/02 396/374 |
| 2008/0192364 A1 * | 8/2008 | Schuttinger | G02B 25/02 359/802 |

(Continued)

*Primary Examiner* — Xi Wang
(74) *Attorney, Agent, or Firm* — Young & Thompson

(57) ABSTRACT

Optical system (10) for imaging an object includes at least: a loupe (12) including a lens (16) for magnifying the object, the lens being disposed in a frame; and a camera (14) arranged between the lens (16) of the loupe (12) and the object to image at least a portion of the same field of view as the lens (16) of the loupe (12).

19 Claims, 1 Drawing Sheet

(56) References Cited

U.S. PATENT DOCUMENTS

| | | | |
|---|---|---|---|
| 2013/0188092 A1* | 7/2013 | Kikuchi | G02B 7/102 348/347 |
| 2013/0241927 A1* | 9/2013 | Vardi | G02B 27/017 345/419 |
| 2015/0092103 A1* | 4/2015 | Lundgren | H04N 5/23241 348/371 |
| 2016/0252799 A1* | 9/2016 | Li | F16M 11/28 396/425 |

* cited by examiner

OPTICAL SYSTEM FOR IMAGING AN OBJECT

FIELD OF THE INVENTION

The invention relates to an optical system for imaging an object. More particularly, the invention relates to the field of loupes.

BACKGROUND OF THE INVENTION

It is known electronic loupes or magnifiers that comprise a camera, and a liquid crystal display (LCD) used as the local screen. The liquid crystal display is small and placed instead of optical lenses. These electronic loupes are used in the same way that a traditional optical loupe.

Nevertheless, such electronic loupes have disadvantages: they are weightier than traditional optical loupes and they have great power consumption due to the embedded LCD screen that reduces the duration of use. Moreover, these electronic magnifiers offer basic treatment methods on images to improve contrast, but not advanced processing functions or image recognition, or transmission to another device.

Therefore, there is a need for a simple and efficient optical system for imaging an object allowing direct and digital viewing.

SUMMARY OF THE INVENTION

Thus, one object of the present invention is to provide an optical system for imaging an object which can be used independently as a traditional optical loupe, but also as a text and image capture device associated with a display or external sound device.

To this end, the invention proposes an optical system for imaging an object comprising at least:
- a loupe comprising a lens for magnifying the object, the lens being disposed in a frame,
- a camera arranged between the lens of the loupe and the object to image at least a portion of the same field of view as the lens of the loupe.

Advantageously, thanks to such optical system it is possible to have a direct-eye viewing of the object through the magnifying lens and to image digitally the object by the camera with the same field of view as the lens of the loupe or with a smaller field of view but with a greater magnification. In this case, several image processing methods can be implemented on the acquired images, for example optical character recognition, contrast enhancement . . . .

According to further embodiments which can be considered alone or in combination:
- the optical system comprises a handle extending from the frame, and wherein the camera:
  - is movable between a retracted position in the handle and an extended position, and
  - is spaced away from the handle in the extended position to image at least a portion of the same field of view as the lens of the loupe;
- the camera is slideably mounted in the handle;
- the handle further houses a telescopic pod pivotally movable between a retracted position in the handle and an extended position wherein the telescopic pod is spaced away from the handle and arranged to position the camera at a distance from the object to obtain a same field of view seen by an eye of a user directly through the lens;
- the loupe and the camera have the same optical axis;
- the optical system comprises a processor for controlling the camera, the processor being also able to process the image for better transmission or acquisition, or to extract feature information from the image, like character recognition;
- the optical system comprises at least a button for manually operating said camera for producing pictures and/or videos of the object;
- the optical system further comprises at least one telecommunication port for transferring said pictures and/or videos from said camera to a remote storing unit and/or for displaying in real time said pictures and/or videos from said camera on a remote display;
- the optical system further comprises a remote storing unit for storing said pictures and/or videos from said camera;
- the optical system further comprises at least one light source disposed on the frame or on the handle for illuminating the object;
- the optical system further comprises a distance sensor for measuring the distance between the camera and the object;
- the optical system further comprises an alert system for alerting the user if the measured distance between the camera and the object is smaller than a minimum focus distance of the camera;
- the optical system further comprises a transparent digital display disposed on the lens and is arranged for displaying in real time pictures and/or videos imaging by said camera when the camera is on and for being transparent when the camera is off;
- the optical system further comprises a transparent digital display disposed on the lens and is arranged for displaying in real time pictures and/or videos imaging by said camera when the camera is in the extended position and for being transparent when the camera is in the retracted position;
- the transparent digital display comprises an obscuring layer configured to be opaque when the camera is active for displaying in real time pictures and/or videos imaging by said camera and for being transparent otherwise;
- the handle houses a battery or an accumulator for powering the camera, and
- the optical system further comprises at least one port for transferring said pictures and/or videos from said camera to a storing unit, said storing unit being able to store said pictures and/or videos from said camera.

BRIEF DESCRIPTION OF THE DRAWINGS

Embodiments of the invention will now be described, by way of example only, and with reference to the following drawings in which.

DETAILED DESCRIPTION OF THE INVENTION

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
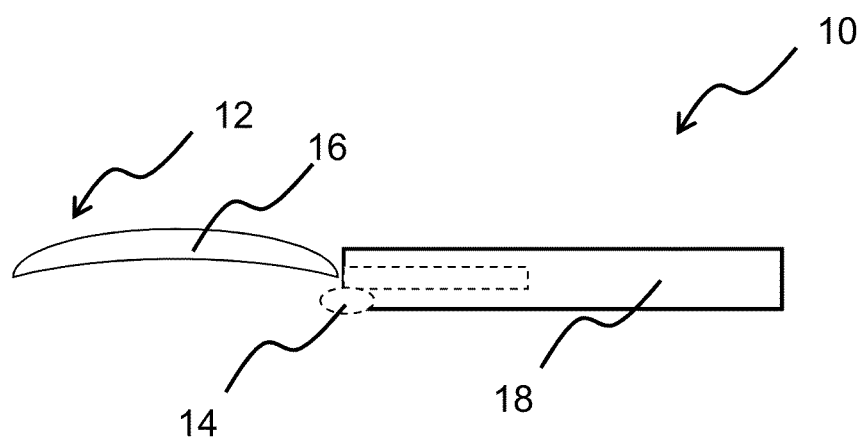
FIG. 1 is a schematic diagram illustrating one embodiment of the invention, the camera being in a retracted position in the handle.
Figure 2:
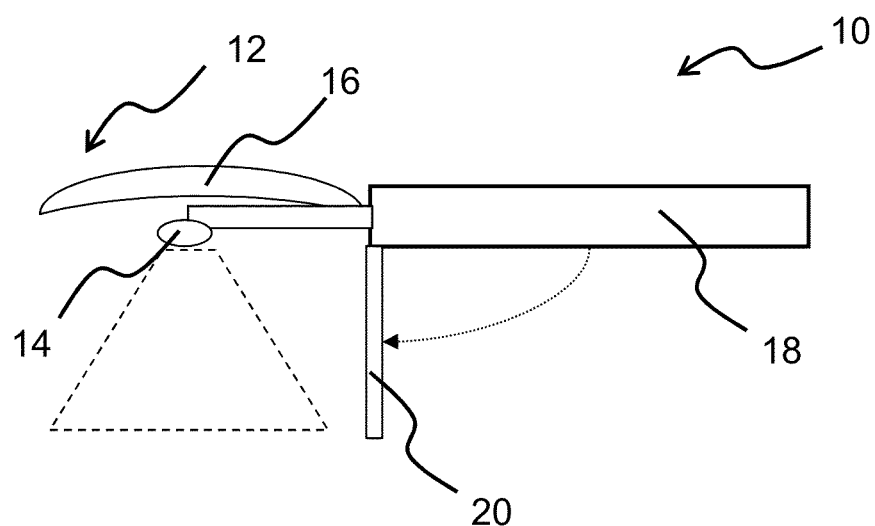
FIG. 2 is a schematic diagram illustrating the optical system of FIG. 1, wherein the camera being in a extended position.

FIGS. 1 and 2 illustrate one embodiment of an optical system 10 for imaging an object according to the invention comprises at least a loupe 12 and a camera 14. The object is preferably an image, such as a printed text.

The loupe 12 comprises a lens 16 for magnifying the object and the lens 16 is disposed in a frame.

The camera 14 is arranged between the lens 16 of the loupe 12 and the object to image at least a portion of the same field of view as the lens 16 of the loupe 12.

Preferably, the optical system 10 comprises a handle 18 extending from the frame according to a longitudinal axis, and the camera 14 is movable between a retracted position in the handle 18 and an extended position. The handle allows a good grip on the loupe.

FIG. 1 illustrates the optical system 10 when the camera 14 is in the retracted position while FIG. 2 illustrates the optical system 10 when the camera 14 is in the extended position.

In the extended position, the camera 14 is spaced away from the handle 18 to image at least a portion of the same field of view as the lens 16 of the loupe 12. Thus, the camera can image the same field of view of the lens or a smaller field of view but with a greater magnification. This can be useful if the magnification rate of the optical lens is not enough to see clearly the object through the lens.

Advantageously, the camera 14 is slideably mounted in the handle 18 according to the longitudinal axis of the handle 18.

Preferably, the loupe 12 and the camera 14 in its extended position have the same optical axis.

According to a subembodiment, the optical system 10 further comprise a telescopic pod 20 advantageously housed in the handle 18. The telescopic pod 20 is pivotally movable between a retracted position in the handle 18 and an extended position. In the extended position illustrated on FIG. 2, the telescopic pod 20 is spaced away from the handle 18 and arranged to position the camera 14 at a distance from the object to obtain a same field of view seen by an eye of a user directly through the lens 16.

Thanks to the telescopic pod, the magnifying lens is positioned at the correct distance from the object to be imaged in order to have a clear image. This also ensures that the field seen by the camera is the same as the field seen through the magnifying lens of the loupe, for intuitive use and an efficient and easy positioning of the camera. This also helps prevent movement during shooting, which is useful for example for people having shivers.

According to a second embodiment of the optical system according to the invention, the optical system is identical to the first embodiment described herein before but is devoid of handle.

In such second embodiment, the camera can be arranged permanently on the surface of the lens facing the object and sensibly in the centre of the lens of the loupe to have the same optical lens as the lens. Thus, the area of the camera must be relatively small in relation to the area loupe for allowing eye to comfortably view the object through the lens, for example sensibly 2 mm×2 mm.

According to a variant, the camera 14 can be movable between a retracted position in the frame and an extended position. In the extended position, the camera 14 is spaced away from the frame to image at least a portion of the same field of view as the lens 16 of the loupe 12.

Advantageously, the camera 14 is pivotally mounted on the frame.

Preferably, the loupe 12 and the camera 14 in the extended position have the same optical axis.

Such embodiments of an optical system according to the invention allow having an optical system of the loupe type which is easy to use and which has low weight compared to existing electronic magnifiers having an embedded liquid crystal display screen that is strong energy consumer.

Whatever the embodiment of the optical system with or without a handle, the optical system comprises a processor for controlling the camera. The processor can be housed in the frame or in the handle.

If the camera does not have the same optical axis as the lens, the processor is preferably configured to implement a method for correcting the images acquired by the camera, such as parallax errors . . . .

Moreover, the optical system preferably comprises a battery or an accumulator for powering the camera. The battery or the accumulator can be housed in the frame or in the handle.

The optical system further comprises at least a button for manually operating said camera for producing pictures and/or videos of the object. The button can be arranged on the frame or on the handle. The button is configured for operating the photographing.

Moreover, the optical system comprises at least one telecommunication port for transferring said pictures and/or videos from said camera to a remote storing unit and/or for displaying in real time said pictures and/or videos from said camera on a remote display. The telecommunication port can be arranged on the handle or on the frame.

The remote display can be a head-mounted display for displaying computer generated image to an eye of a user, any display device such a mobile phone, or a specialized system for image viewing on a large screen for the visually impaired.

Furthermore, the optical system can further comprise one or several ports for transferring said pictures and/or videos from said camera to a storing unit. The storing unit is so able to store said pictures and/or videos from said camera.

The optical system can comprises a storing unit for storing said pictures and/or videos from said camera. The storing unit can be a remote storing unit or housed in the frame or in the handle.

In the case wherein the optical system comprises an embedded storing unit, the processor can be configured to implement a storing method comprising a step for checking the quality of acquired images before storing only images having a <<good quality>>, for example not blurred images. The processor can also be configured to implement a storing method comprising a step for selecting a best image among several acquired images before storing only this one, the best image having the best quality. The storing method can also comprise an image compression step for example JPEG or binarization, or a feature extraction step, for example character recognition. The stored images can thus be transmitted to a remote display device, for example via Bluethooth, WiFi or USB connexion.

Preferably, the optical system further comprises at least one light source disposed on the frame or on the handle for illuminating the object. Advantageously, the light sources are LED or OLED to illuminate the object configured to illuminate according continuously or a pulsed mode, for example synchronized with the frequency of acquisition of the camera or a flash mode to improve the quality of acquired images.

Advantageously, the optical system further comprises a distance sensor for measuring the distance between the camera and the object.

The optical system further comprises an alert system for alerting the user if the measured distance between the camera and the object is smaller than a the minimum focus distance of the camera. This prevents to acquire blurred images.

According to a third embodiment compatible with the previous ones, the optical system further comprises a transparent digital display disposed on the lens. The transparent digital display is arranged for displaying in real time pictures and/or videos imaging by said camera when the camera is on and for being transparent when the camera is off. The lens is arranged between the transparent digital display and the camera.

In the embodiment of the optical system wherein the camera is movable between a retracted position and an extended position, the transparent digital display is preferably arranged for displaying in real time pictures and/or videos imaging by said camera when the camera is in the extended position and for being transparent when the camera is in the retracted position.

The transparent digital display comprises an obscuring layer configured to be opaque when the camera is active for displaying in real time pictures and/or videos imaging by said camera and for being transparent otherwise.

For example, the obscuring layer is an electrochromic layer configured to be obscured when the camera is on.

The invention claimed is:

1. An optical system for imaging an object comprising at least:
   a loupe comprising a lens for magnifying the object, the lens being disposed in a frame;
   a camera arranged between the lens of the loupe and the object to image at least a portion of the same field of view as the lens of the loupe;
   a handle extending from the frame, wherein the camera:
      is movable between a retracted position in the handle and an extended position, and
      is spaced away from the handle in the extended position to image at least a portion of the same field of view as the lens of the loupe; and
   a transparent digital display disposed on the lens and is arranged for displaying in real time pictures and/or videos imaging by said camera when the camera is in the extended position and for being transparent when the camera is in the retracted position.

2. The optical system according to claim 1, wherein the camera is slideably mounted in the handle.

3. The optical system according to claim 1, wherein the handle further houses a telescopic pod pivotally movable between a retracted position in the handle and an extended position wherein the telescopic pod is spaced away from the handle and arranged to position the camera at a distance from the object to obtain a same field of view seen by an eye of a user directly through the lens.

4. The optical system according to claim 1, wherein the loupe and the camera in the extended position have the same optical axis.

5. The optical system according to claim 1, further comprising a processor for controlling the camera.

6. The optical system according to claim 1, further comprising at least a button for manually operating said camera for producing pictures and/or videos of the object.

7. The optical system according to claim 1, further comprising at least one telecommunication port for transferring pictures and/or videos produced from said camera to a remote storing unit and/or for displaying in real time said pictures and/or videos from said camera on a remote display.

8. The optical system according to claim 1, further comprising a remote storing unit for storing pictures and/or videos produced from said camera.

9. The optical system according to claim 1, further comprising at least one light source disposed on the frame for illuminating the object.

10. The optical system according to claim 1, further comprising a distance sensor for measuring the distance between the camera and the object.

11. The optical system according to claim 10, further comprising an alert system for alerting the user if the measured distance between the camera and the object is smaller than a focal length of the camera.

12. The optical system according to claim 1, further comprising a transparent digital display disposed on the lens and is arranged for displaying in real time pictures and/or videos imaging by said camera when the camera is on and for being transparent when the camera is off.

13. The optical system according to claim 12, wherein the transparent digital display comprises an obscuring layer configured to be opaque when the camera is active for displaying in real time pictures and/or videos imaging by said camera and for being transparent otherwise.

14. The optical system according to claim 2, wherein the handle further houses a telescopic pod pivotally movable between a retracted position in the handle and an extended position wherein the telescopic pod is spaced away from the handle and arranged to position the camera at a distance from the object to obtain a same field of view seen by an eye of a user directly through the lens.

15. The optical system according to claim 1, wherein the transparent digital display comprises an obscuring layer configured to be opaque when the camera is active for displaying in real time pictures and/or videos imaging by said camera and for being transparent otherwise.

16. The optical system according to claim 1, further comprising at least one light source disposed on the frame for illuminating the object, and the at least one light source is an LED or an OLED.

17. The optical system according to claim 16, wherein the light source is operated continuously.

18. The optical system according to claim 16, wherein the light source is operated pulsed synchronized with a frequency of acquisition of the camera.

19. The optical system according to claim 16, wherein the light source is operated in flash mode.

* * * * *